(12) United States Patent
Chen et al.

(10) Patent No.: US 10,819,019 B2
(45) Date of Patent: Oct. 27, 2020

(54) MOBILE COMMUNICATION DEVICE AND ANTENNA THEREOF

(71) Applicant: HUIZHOU TCL MOBILE COMMUNICATION CO., LTD., Huizhou (CN)

(72) Inventors: Lei Chen, Huizhou (CN); Liyun Liu, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/623,387

(22) PCT Filed: Jul. 24, 2018

(86) PCT No.: PCT/CN2018/096769
§ 371 (c)(1),
(2) Date: Dec. 16, 2019

(87) PCT Pub. No.: WO2019/019995
PCT Pub. Date: Jan. 31, 2019

(65) Prior Publication Data
US 2020/0176853 A1 Jun. 4, 2020

(30) Foreign Application Priority Data
Jul. 24, 2017 (CN) .......................... 2017 1 0607401

(51) Int. Cl.
*H01Q 1/24* (2006.01)
*H01Q 5/20* (2015.01)
(Continued)

(52) U.S. Cl.
CPC .......... *H01Q 1/243* (2013.01); *H01Q 1/2291* (2013.01); *H01Q 5/20* (2015.01); *H04R 1/04* (2013.01);
(Continued)

(58) Field of Classification Search
CPC ........ H01Q 1/243; H01Q 5/20; H01Q 1/2291; H04R 1/04; H04R 1/406; H04R 3/005
See application file for complete search history.

(56) References Cited

U.S. PATENT DOCUMENTS

| | | | |
|---|---|---|---|
| 2002/0142794 A1 | 10/2002 | Harano | |
| 2005/0128151 A1* | 6/2005 | Kwak, II | H01Q 1/243 343/702 |

(Continued)

FOREIGN PATENT DOCUMENTS

| | | |
|---|---|---|
| CN | 201893896 U | 7/2011 |
| CN | 102271171 A | 12/2011 |

(Continued)

OTHER PUBLICATIONS

International Search Report for Application No. PCT/CN2018/096769 dated Sep. 28, 2018.
(Continued)

*Primary Examiner* — Md K Talukder

(57) ABSTRACT

A mobile communication device and an antenna thereof are provided. The antenna includes a microphone and an antenna feeder, both arranged on a main board of the mobile communication device. The microphone includes a body portion, a first ground terminal and a second ground terminal. The first ground terminal surrounds a sidewall of the body portion, the first ground terminal and the second ground terminal are electrically connected, and the second ground terminal is electrically connected with the body portion. The main board is further arranged with a radio frequency module and a main board ground terminal. The radio frequency module is electrically connected with the first ground terminal through the antenna feeder, and the main board ground terminal and the second ground terminal are electrically connected.

15 Claims, 3 Drawing Sheets

(51) Int. Cl.
   *H01Q 1/22* (2006.01)
   *H04R 1/04* (2006.01)
   *H04R 1/40* (2006.01)
   *H04R 3/00* (2006.01)

(52) U.S. Cl.
   CPC ............ *H04R 1/406* (2013.01); *H04R 3/005* (2013.01); *H04R 2410/05* (2013.01); *H04R 2499/11* (2013.01)

(56) References Cited

U.S. PATENT DOCUMENTS

| | | | |
|---|---|---|---|
| 2005/0239519 A1* | 10/2005 | Saitou | H01Q 3/247 455/575.1 |
| 2011/0028191 A1 | 2/2011 | Huang et al. | |
| 2014/0368398 A1* | 12/2014 | Ying | H01Q 1/48 343/841 |
| 2015/0244063 A1 | 8/2015 | Sowpati | |
| 2017/0048363 A1* | 2/2017 | Lee | H04B 1/3833 |
| 2017/0365910 A1* | 12/2017 | Zachara | H01Q 1/50 |
| 2020/0176853 A1* | 6/2020 | Chen | H04M 1/03 |

FOREIGN PATENT DOCUMENTS

| | | |
|---|---|---|
| CN | 102665161 A | 9/2012 |
| CN | 102904002 A | 1/2013 |
| CN | 202817184 U | 3/2013 |
| CN | 202871972 U | 4/2013 |
| CN | 104333830 A | 2/2015 |
| CN | 105187991 A | 12/2015 |
| CN | 107528937 A | 12/2017 |
| EP | 1703585 A2 | 9/2006 |
| JP | 2000341783 A | 12/2000 |
| JP | 3227142 B2 | 11/2001 |

OTHER PUBLICATIONS

European search report, EP18839039, dated Jun. 19, 2020 (8 pages).

* cited by examiner

US 10,819,019 B2

MOBILE COMMUNICATION DEVICE AND ANTENNA THEREOF

CROSS REFERENCE TO RELATED APPLICATIONS

The present application is a 35 U.S.C. § 371 National Phase conversion of International (PCT) Patent Application No. PCT/CN2018/096769 filed on Jul. 24, 2018, which claims foreign priority of Chinese Patent Application No. 201710607401.7, filed on Jul. 24, 2017, in China National Intellectual Property Administration, the contents of all of which are hereby incorporated by reference.

TECHNICAL FIELD

The present disclosure relates to the field of mobile communication, and in particular to a mobile communication device and an antenna thereof.

BACKGROUND

As technologies develop continually, a mobile communication device tends to be designed to be lighter and thinner. Therefore, a space inside the mobile communication device to receive various components may be increasingly limited. During industry development, a long-term topic may be how to produce an antenna having a relatively high radio frequency with reduced cost and occupying a reduced space.

SUMMARY OF THE DISCLOSURE

According to the present disclosure, a mobile communication device and an antenna of a mobile communication device may be provided, and a microphone arranged with the mobile communication device may be used as a part of the antenna.

To achieve the above-mentioned purpose, the present disclosure may provide following technical solutions.

An antenna of a mobile communication device includes a microphone and an antenna feeder, wherein the microphone and the antenna feeder are arranged on a main board of the mobile communication device. The microphone includes a body portion, a first ground terminal of the microphone, and a second ground terminal of the microphone. The first ground terminal of the microphone is arranged to surround a sidewall of the body portion, the first ground terminal and the second ground terminal may be electrically connected, and the second ground terminal of the microphone is arranged to be electrically connected with the body portion. The main board is further arranged with a radio frequency module and a main board ground terminal. The radio frequency module may be electrically connected with the first ground terminal of the microphone through the antenna feeder, and the main board ground terminal may be electrically connected with the second ground terminal of the microphone.

In one implementation, the second ground terminal of the microphone may be a ground line arranged at a bottom of the body portion.

In one implementation, the mobile communication device may include dual microphones, arranged to reduce noise during phone calls. The dual microphones may include a call collecting microphone and a background sound collecting microphone arranged at two ends of the mobile communication device. The microphone used as a part of the antenna may be the background sound collecting microphone.

In one implementation, the first ground terminal and the second ground terminal of the microphone may be made from copper.

In one implementation, the antenna may be ring-shaped, a half wavelength of the ring-shaped antenna may resonate with a band of a fifth generation (5G) mobile network of Wi-Fi connection.

In one implementation, a length of the antenna may be a sum of a length of the antenna feeder, a perimeter of the first ground terminal of the microphone, and a length of the second ground terminal of the microphone.

In one implementation, the radio frequency module and the main board ground terminal may be arranged on different layers of the main board.

The present disclosure further provides a mobile communication device, including a main board and the above-mentioned antenna arranged on the main board.

According to embodiments of the present disclosure, the mobile communication device and the antenna thereof may be provided. The antenna may be formed by connecting the microphone with the radio frequency module and by connecting the microphone with the main board ground terminal. A separate feeding point elastic sheet and a separate antenna line may not need to be arranged, saving production cost and occupation space inside the mobile communication device, but also reserving performance of the antenna.

DETAILED DESCRIPTION

Figure 1:
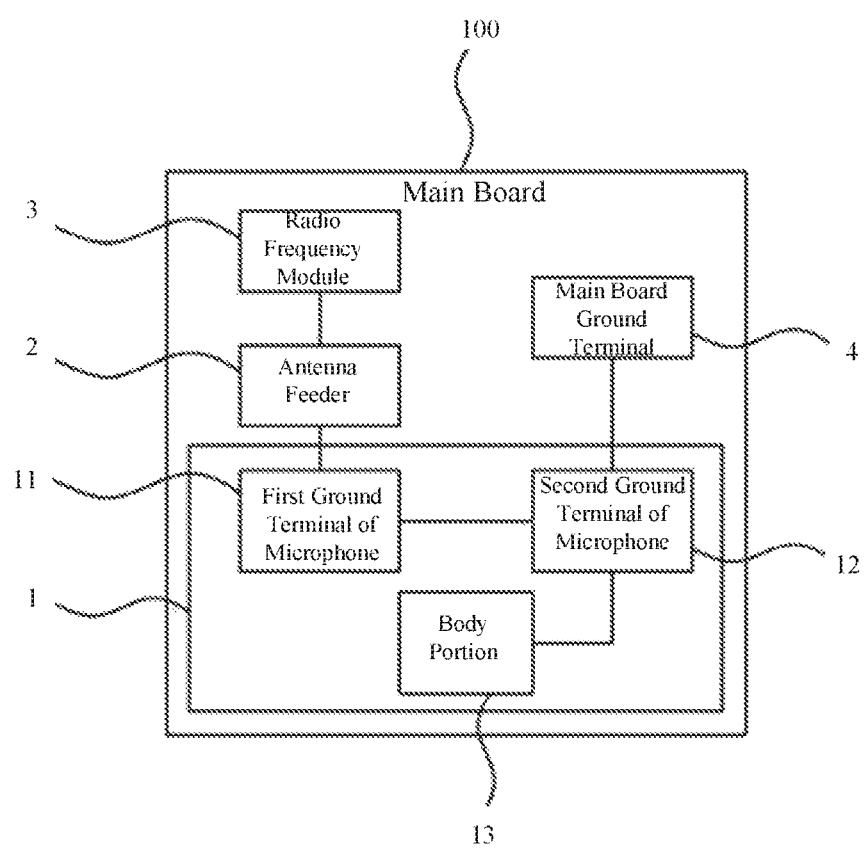
FIG. 1 is a structural diagram of a mobile communication device according to an embodiment of the present disclosure.

To clarify objectives and technical solution of the present disclosure, the present disclosure may be illustrated in details by referring to the drawings and embodiments. Examples of the embodiments are shown in the drawings. Implementations shown in the drawings and illustrated based on the drawings are exemplary, and shall not limit the present disclosure.

To be noted that, to avoid deviating from the present disclosure due to unnecessary details, the drawings show structures and/or treatment operations closely related to the technical solutions of the present disclosure only, and omit some details that are not closely related to the present disclosure.

Figure 2:
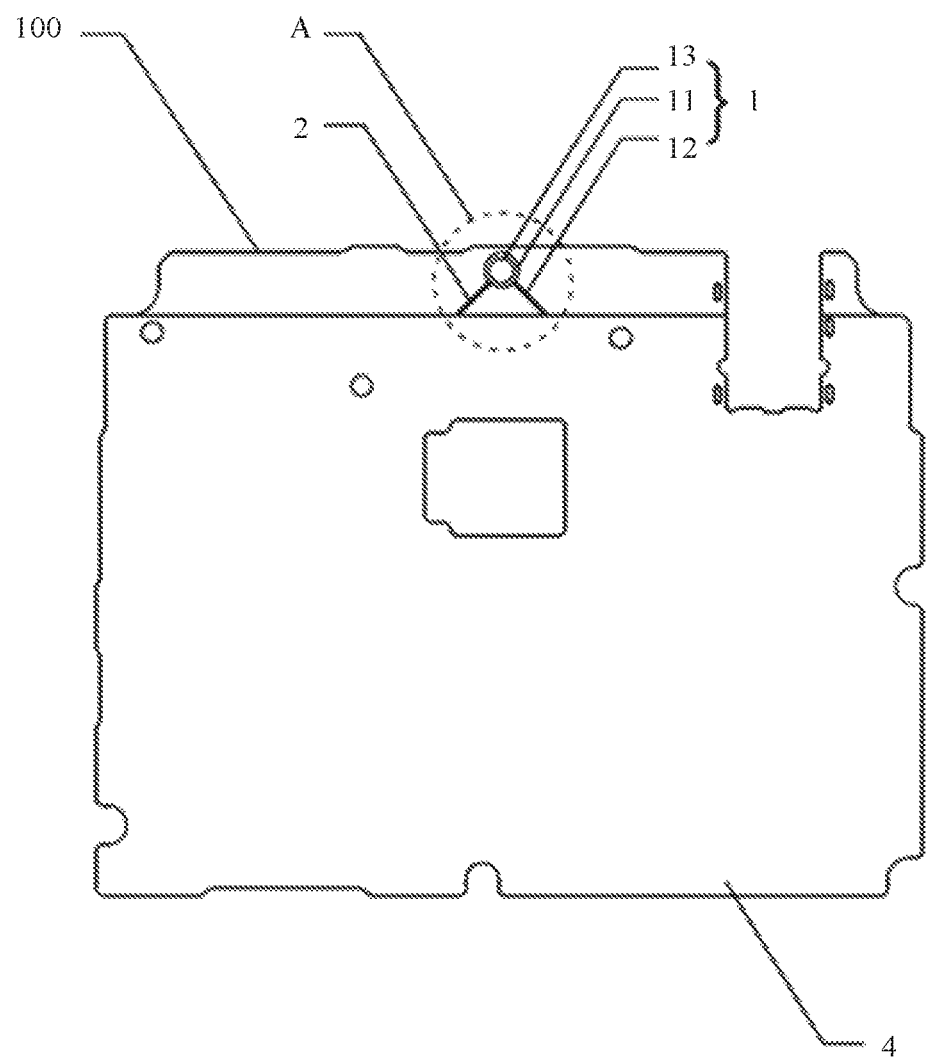
FIG. 2 is a structural diagram of an antenna according to an embodiment of the present disclosure.
Figure 3:
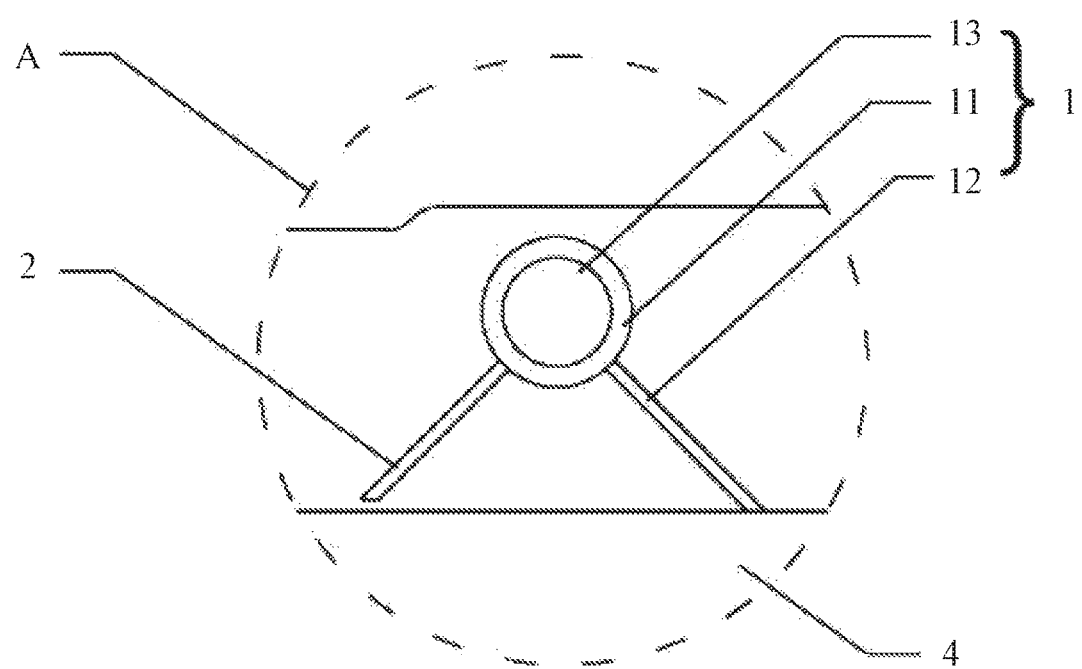
FIG. 3 is an enlarged view of a region III shown in FIG. 2.

Referring to FIGS. 1 to 3, embodiments of the present disclosure provide a mobile communication device and an antenna thereof. The antenna includes a microphone 1 and an antenna feeder 2, and the microphone 1 and the antenna feeder 2 are arranged on a main board 100. The microphone 1 includes a body portion 13, a first ground terminal 11 of the microphone, and a second ground terminal 12 of the microphone. The first ground terminal 11 of the microphone may be arranged to surround a sidewall of the body portion 13. The first ground terminal 11 of the microphone and the second ground terminal 12 of the microphone may be electrically connected. The second ground terminal 12 of the microphone may be electrically connected with the body portion 13. The main board 100 may further be arranged with a radio frequency module 3 and a main board ground terminal 4. The radio frequency 3 may be electrically connected with the first ground terminal 11 of the microphone via the antenna feeder 2. The main board ground terminal 4 may be electrically connected with the second ground terminal 12 of the microphone.

In the present embodiment, the antenna may use the microphone 1 arranged on the main board 100 as a radiator of the antenna. The antenna feeder 2 may be electrically connected with the first ground terminal 11 of the microphone and the radio frequency module 3, the second ground terminal 12 of the microphone may be electrically connected with the main board ground terminal 4, the first ground terminal 11 of the microphone may serve as a feeding point elastic sheet of the antenna, and the second ground terminal 12 of the microphone may serve as a feeding ground elastic sheet. In such a way, an additional feeding point elastic sheet, an additional feeding ground elastic sheet, and an additional antenna line may not be required, saving manufacturing cost and occupation space inside the mobile communication device, the mobile communication device may meet the development tendency of the art, providing a lighter and thinner structure.

Referring to FIG. 2 and FIG. 3, to be specific, the second ground terminal 12 of the microphone may be a ground line arranged at a bottom of the body portion 13. The second ground terminal 12 of the microphone and the body portion 13 may be connected, and the first ground terminal 11 of the microphone may be a metal ring-shaped shell arranged on a periphery of the body portion 13.

Further, the above-mentioned mobile communication device may include dual microphones to reduce noise during phone calls. The dual microphones may include a voice collecting microphone and a background sound collecting microphone arranged at two ends of the mobile communication device. The microphone 1 of the antenna may be the background sound collecting microphone.

The dual microphones to reduce noise are broadly applied in the field of mobile communication devices. The voice collecting microphone and the background sound collecting microphone may be arranged. The voice collecting microphone may be arranged at a bottom of the mobile communication device to collect a voice of a user during phone calls. The background sound collecting microphone may be arranged at a top of the mobile communication device away from the voice collecting microphone. During a phone call, each of the voice collecting microphone and the background sound collecting microphone may acquire an audio signal, the audio signal collected by the background sound collecting microphone may be subtracted from the audio signal collected by the voice collecting microphone, a difference of the audio signals after the subtraction may be amplified subsequently, and an audio signal with most of noise eliminated may be obtained, improving intelligibility of the voice during the phone call. In the present embodiment, the background sound collecting microphone arranged at the top of the mobile communication device may serve as the microphone 1 of the antenna, such that a Wi-Fi antenna may be formed in a space at the top of the mobile communication device.

Further, the antenna may be ring-shaped, and a half wavelength of the ring-shaped antenna may resonate with a band of the 5G mobile network. A frequency of the 5G band may be high, and a wavelength of the 5G band may be short, therefore, a size of the microphone 1 may meet a requirement for serving for the 5G band, such that the antenna may have a relatively high radiating performance.

In the present embodiment, a length of the antenna may be a sum of a length of the antenna feeder 2, a perimeter of the first ground terminal 11 of the microphone, and a length of the second ground terminal 12 of the microphone. As a width of the antenna feeder 2 and a width of the second ground terminal 12 of the microphone may be relatively large, during calculating the length of the antenna, a length of an inner side of the antenna feeder 2 close to the second ground terminal 12 of the microphone may be different from a length of an outer side of the antenna feeder 2 away from the second ground terminal 12 of the microphone. Similarly, a length of an inner side of the second ground terminal 12 of the microphone close to the antenna feeder 2 may be different from a length of an outer side of the second ground terminal 12 of the microphone away from the antenna feeder 2. Therefore, while arranging the antenna, the perimeter of the first ground terminal 11 of the microphone, the length of the second ground terminal 12 of the microphone, the length of the antenna feeder 2, the width of the antenna feeder 2, and the width of the second ground terminal 12 of the microphone may be adjusted to allow the half wavelength of the antenna to resonate with band of the 5G of the Wi-Fi connection.

To be exemplary, the first ground terminal 11 of the microphone and the second ground terminal 12 of the microphone may be made from copper.

In the present embodiment, the radio frequency module 3 and the main board ground terminal 4 may be arranged on different layers of the main board 100. The main board ground terminal 4 may be arranged on a ground layer of the main board 100, and the radio frequency module 3 may be arranged on another layer of the main board 100.

The present disclosure further provides a mobile communication device, including a main board 100 and an antenna arranged on the main board 100.

To summarize, the present disclosure provides a mobile communication device and an antenna thereof. The microphone 1 may be connected with the radio frequency 3 and the main board ground terminal 4 to form the antenna. Additional feeding point elastic sheet and antenna lines may not be required for the antenna, saving manufacture cost and occupation space inside the mobile communication device and ensuring the performance of the antenna, such that the antenna may be able to serve for the band of the 5G of the Wi-Fi connection.

To be noted that, in the present application, terms of "first" and "second" may be used to distinguish an entity or operation from another entity or operation, but not to implicit the entities or operations being related with each other or being performed along a particular order. Further, terms of "include", "comprise", or other equivalent terms indicate non-exclusive inclusion, such that the process, the method, the object, or the device that includes a series of elements may further include other elements that are not listed explicitly or include inherent elements included by such process, such method, such object, or such device. Without further restrictions, elements defined by words of "including an/a . . . " do not exclude other same elements included by such process, such method, such object, or such device.

The above descriptions are particular implementations of the present disclosure only. To be noted that, to any one of skill in the related art, without departing from the principle of the present disclosure, improvements and polishing may be performed and shall be within the scope of the present disclosure.

What is claimed is:

1. An antenna for a mobile communication device, comprising:
a microphone, an antenna feeder, a radio frequency, and a main board ground terminal, all arranged on a main board of the mobile communication device, wherein the microphone comprises:
a body portion; and
a first ground terminal of the microphone and a second ground terminal of the microphone, wherein the first ground terminal of the microphone is arranged to surround a sidewall of the body portion, the first ground terminal of the microphone is electrically connected with the second ground terminal of the microphone, the second ground terminal of the microphone is electrically connected with the body portion, and the second ground terminal of the microphone is a ground line arranged at a bottom of the body portion; and
the radio frequency is electrically connected with the first ground terminal of the microphone through the antenna feeder, the main board ground terminal is electrically connected with the second ground terminal of the microphone, and the radio frequency module and the main board ground terminal may be arranged on different layers of the main board.

2. An antenna for a mobile communication device, comprising:
a microphone, an antenna feeder, a radio frequency, and a main board ground terminal, all arranged on a main board of the mobile communication device, wherein the microphone comprises:
a body portion; and
a first ground terminal of the microphone and a second ground terminal of the microphone, wherein the first ground terminal of the microphone is arranged to surround a sidewall of the body portion, the first ground terminal of the microphone is electrically connected with the second ground terminal of the microphone, and the second ground terminal of the microphone is electrically connected with the body portion; and
the radio frequency is electrically connected with the first ground terminal of the microphone through the antenna feeder, and the main board ground terminal is electrically connected with the second ground terminal of the microphone.

3. The antenna for the mobile communication device according to claim 2, wherein the second ground terminal of the microphone is a ground line arranged at a bottom of the body portion.

4. The antenna for the mobile communication device according to claim 3, wherein the mobile communication device comprises dual microphones to reduce noise during phone calls, the dual microphones comprises a voice collecting microphone and a background sound collecting microphone arranged at two ends of the mobile communication device, and the microphone used as a part of the antenna is the background sound collecting microphone.

5. The antenna for the mobile communication device according to claim 3, wherein the first ground terminal of the microphone and the second ground terminal of the microphone are made from copper.

6. The antenna for the mobile communication device according to claim 4, wherein the antenna is ring-shaped, and a half wavelength of the ring-shaped antenna resonates with a band of a fifth generation mobile network of Wi-Fi connection.

7. The antenna for the mobile communication device according to claim 6, wherein a length of the antenna is a sum of a length of the antenna feeder, a perimeter of the first ground terminal of the microphone, and a length of the second ground terminal of the microphone.

8. The antenna for the mobile communication device according to claim 2, wherein the radio frequency module and the main board ground terminal are arranged on different layers of the main board.

9. A mobile communication device, comprising:
a main board and an antenna arranged on the main board, wherein
the antenna comprises: a microphone and an antenna feeder, both arranged on the main board, wherein the microphone comprises a body portion, a first ground terminal of the microphone, and a second ground terminal of the microphone, the first ground terminal of the microphone is arranged to surround a sidewall of the body portion, the first ground terminal of the microphone is electrically connected with the second ground terminal of the microphone, the second ground terminal of the microphone is electrically connected with the body portion; and
the main board is further arranged with a radio frequency module and a main board ground terminal, the radio frequency is electrically connected with the first ground terminal of the microphone through the antenna feeder, and the main board ground terminal is electrically connected with the second ground terminal of the microphone.

10. The mobile communication device according to claim 9, wherein the second ground terminal is a ground line arranged at a bottom of the body portion.

11. The mobile communication device according to claim 10, further comprising dual microphones to reduce noise during phone calls, wherein the dual microphones comprise a voice collecting microphone and a background sound collecting microphone arranged at two ends of the mobile communication device, and the microphone used as a part of the antenna is the background sound collecting microphone.

12. The mobile communication device according to claim 10, wherein the first ground terminal of the microphone and the second ground terminal of the microphone are made from copper.

13. The mobile communication device according to claim 11, wherein the antenna is ring-shaped, and a half wavelength of the ring-shaped antenna resonates with a band of a band of a fifth generation mobile network of Wi-Fi connection.

14. The mobile communication device according to claim 13, wherein a length of the antenna is a sum of a length of the antenna feeder, a perimeter of the first ground terminal of the microphone, and a length of the second ground terminal of the microphone.

15. The mobile communication device according to claim 9, wherein the radio frequency module and the main board ground terminal are arranged on different layers of the main board.

* * * * *